US012784571B2

(12) United States Patent
Devereaux et al.

(10) Patent No.: US 12,784,571 B2
(45) Date of Patent: Nov. 3, 2026

(54) SYSTEMS AND METHODS FOR TEMPORARY PAUSING OF UTILITY ALARM

(71) Applicant: Aclara Technologies LLC, St. Louis, MO (US)

(72) Inventors: Peggy Rose Devereaux, Saint Louis, MO (US); Thomas Barrett McLaughlin, Saint Louis, MO (US)

(73) Assignee: Aclara Technologies LLC, St. Louis, MO (US)

( * ) Notice: Subject to any disclaimer, the term of this patent is extended or adjusted under 35 U.S.C. 154(b) by 38 days.

(21) Appl. No.: 18/862,133

(22) PCT Filed: May 2, 2023

(86) PCT No.: PCT/US2023/020640

§ 371 (c)(1),
(2) Date: Oct. 31, 2024

(87) PCT Pub. No.: WO2023/215258

PCT Pub. Date: Nov. 9, 2023

(65) Prior Publication Data

US 2025/0299556 A1 Sep. 25, 2025

Related U.S. Application Data

(60) Provisional application No. 63/349,529, filed on Jun. 6, 2022, provisional application No. 63/337,393, filed on May 2, 2022.

(51) Int. Cl.

| | |
|---|---|
| ***G08B 25/00*** | (2006.01) |
| ***G08B 21/16*** | (2006.01) |
| ***G08B 25/10*** | (2006.01) |

(52) U.S. Cl.

CPC .......... *G08B 25/006* (2013.01); *G08B 21/16* (2013.01); *G08B 25/10* (2013.01)

(58) Field of Classification Search

None

See application file for complete search history.

(56) References Cited

U.S. PATENT DOCUMENTS 6,753,786 B1 6/2004 Apperson et al.
2011/0309931 A1 12/2011 Rose (Continued)

FOREIGN PATENT DOCUMENTS

CN 111629658 A * 9/2020 ............. G10L 25/78

OTHER PUBLICATIONS

PCT/US2023/020640 International Search Report and Written Opinion dated Jul. 26, 2023 (16 pages).

(Continued)

*Primary Examiner* — Carlos Garcia

(74) *Attorney, Agent, or Firm* — Michael Best & Friedrich LLP

(57) ABSTRACT

A utility sensor module includes one or more sensors and an electronic processor. The electronic processor is configured to receive a pause mode command and initiate a pause mode timer at a first predefined timer value in response to receiving the pause mode command. The electronic processor is further configured to change an operating mode of the utility sensor module to a pause mode, wherein operation in the pause mode causes the sensor module to not generate an alarm when a parameter sensed by the sensors exceeds a predetermined threshold. The electronic processor is also configured to transmit a signal to a utility system indicating that the operating mode has been changed to the pause mode and determine whether the pause mode timer has expired. In response to determining that the pause mode timer has (Continued)

expired, the electronic processor changes the operating mode to a normal operation.

20 Claims, 9 Drawing Sheets

(56) References Cited

U.S. PATENT DOCUMENTS

| | | | |
|---|---|---|---|
| 2016/0063833 | A1 | 3/2016 | Schultz et al. |
| 2018/0061217 | A1 | 3/2018 | Eichler |
| 2020/0116373 | A1 | 4/2020 | Guan et al. |
| 2021/0280292 | A1 | 9/2021 | Monirabbasi et al. |
| 2022/0044140 | A1 | 2/2022 | Mullaly et al. |

OTHER PUBLICATIONS

Extended European Search Report dated Mar. 31, 2026 for corresponding European Application No. 23799902.4, pp. 1-10.

* cited by examiner

SYSTEMS AND METHODS FOR TEMPORARY PAUSING OF UTILITY ALARM

RELATED APPLICATIONS

This application is a 371 Application claiming priority to, and the benefit of, PCT Patent Application No. PCT/US2023/020640, filed May 2, 2023, which claims the benefit of U.S. Provisional Patent Application Nos. 63/337,393, filed May 2, 2022, and 63/349,529, filed Jun. 6, 2022, the entire content of each of which is hereby incorporated by reference.

FIELD

Embodiments of the disclosure relate to controlling utility sensing systems during various operations and, more particularly, to pausing an alarm function of a specific sensor in response to an input provided by a user, such as an installer or maintenance professional.

BACKGROUND

Connected or smart utility meters and/or sensors are increasingly common in utility systems, e.g., gas, electric, water, etc. These connected sensors allow for data to be provided directly to a central utility system for processing, billing, maintenance, etc. In some instances, an alarm may be directly provided to a utility system, thereby causing the utility system to dispatch maintenance and/or emergency responders (e.g., fire, EMT, police) depending on the type of alarm received. However, during servicing or installation of certain components, unintended alarms may be generated. For example, during a gas meter installation, a connected methane sensor may detect enough methane to generate an alarm, which is then communicated to the utility system, possibly resulting in technicians and or emergency responders being dispatched.

SUMMARY

The systems and methods described herein provide a technician or other utility worker with an ability to temporarily pause an alarm operation of a connected sensor within a utility system. This can allow the technician to perform their required work without concern of an unnecessary alarm being generated, possibly resulting in other technical personnel and/or emergency responders being dispatched.

In one embodiment, a utility sensor module includes one or more sensors and an electronic processor. The electronic processor is configured to receive a pause mode command and initiate a pause mode timer at a first predefined timer value in response to receiving the pause mode command. The electronic processor is further configured to change an operating mode of the utility sensor module to a pause mode, wherein operation in the pause mode causes the sensor module to not generate an alarm when a parameter sensed by the sensors exceeds a predetermined threshold. The electronic processor is also configured to transmit a signal to a utility system indicating that the operating mode has been changed to the pause mode and determine whether the pause mode timer has expired. In response to determining that the pause mode timer has expired, the electronic processor changes the operating mode to a normal operation.

In one aspect, the pause mode command is received from a user communication device.

In another aspect, the pause mode command is received via a user interface of the sensor module.

In another aspect, the electronic processor is further configured to receive a pause mode cancel command and change the operating mode to the normal operating mode in response to receiving the pause mode cancel command.

In another aspect, the electronic processor is further configured to receive a timer modification command, wherein the timer modification command includes a second predefined timer value.

In another aspect, the electronic processor is further configured to adjust the pause mode timer to the second predefined timer value in response to receiving the timer modification command.

In another aspect, the one or more sensors include a methane detection sensor.

In another embodiment, a method for changing an operational mode of a sensor module includes receiving a pause mode command at the sensor module and initiating a pause mode timer at a first predefined timer value in response to receiving the pause mode command. The method further includes changing an operating mode to a pause mode, wherein operation in the pause mode causes the sensor module to not generate an alarm when a parameter sensed by one or more sensors of the sensor module exceeds a predetermined threshold. The method also includes transmitting a signal to a utility system indicating that the operating mode has been changed to the pause mode. The method further includes determining whether the pause mode timer has expired and changing the operating mode to a normal operating mode in response to determining that the pause mode timer has expired.

In one aspect, the pause mode command is received from an external communication device.

In another aspect, the pause mode command is received via a user interface of the sensor module.

In another aspect, the method further includes receiving a pause mode cancel command and changing the operating mode to the normal operation mode in response to receiving the pause mode cancel command.

In another aspect, the method further includes receiving a timer modification command including a second predefined timer value.

In another aspect, the method further includes adjusting the pause mode timer to the second predefined timer value in response to receiving the timer modification command.

In another aspect, the one or more sensors include a methane detection sensor.

In another embodiment, a utility monitoring system includes at least one sensor module having one or more sensors for sensing aspects of a utility system. The at least one sensor module is configured to generate an alarm when a parameter sensed by the one or more sensors exceeds a predetermined threshold. The system also includes a hub device configured to receive data from the at least one sensor module. The hub device includes an electronic processor. The electronic processor is configured to receive a pause mode command and initiate a pause mode timer at a first predefined timer value in response to receiving the pause mode command. The electronic processor is further configured to change an operating mode of the utility sensor module to a pause mode, wherein operation in the pause mode causes the hub device to not transmit an alarm received from the at least one sensor module when a parameter sensed by at least one sensor module exceeds a predetermined threshold. The electronic processor is also configured to transmit a signal to a utility system indicating that the operating mode has been changed to the pause mode. The electronic processor is further configured to determine whether the pause mode timer has expired and determine whether a pause mode cancel command was received. In response to determining that one of the pause mode timer has expired or the pause mode cancel command was received, the electronic processor changes the operating mode to a normal operation.

In one aspect, the pause mode command is received from an external communication device.

In another aspect, the pause mode command is received via a user interface of the hub device.

In another aspect, the electronic processor of the hub device is further configured to receive a timer modification command, wherein the timer modification command includes a second predefined timer value.

In another aspect, the electronic processor is further configured to adjust the pause mode timer to the second predefined timer value in response to receiving the timer modification command.

In another aspect, the electronic processor is further configured to, when operating in the pause mode, transmit an alarm in response to a parameter sensed by the at least one sensor module exceeding a pause mode alarm threshold value, wherein the pause mode alarm threshold is greater than the predetermined threshold.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claims and explain various principles and advantages of those embodiments.

Figure 1:
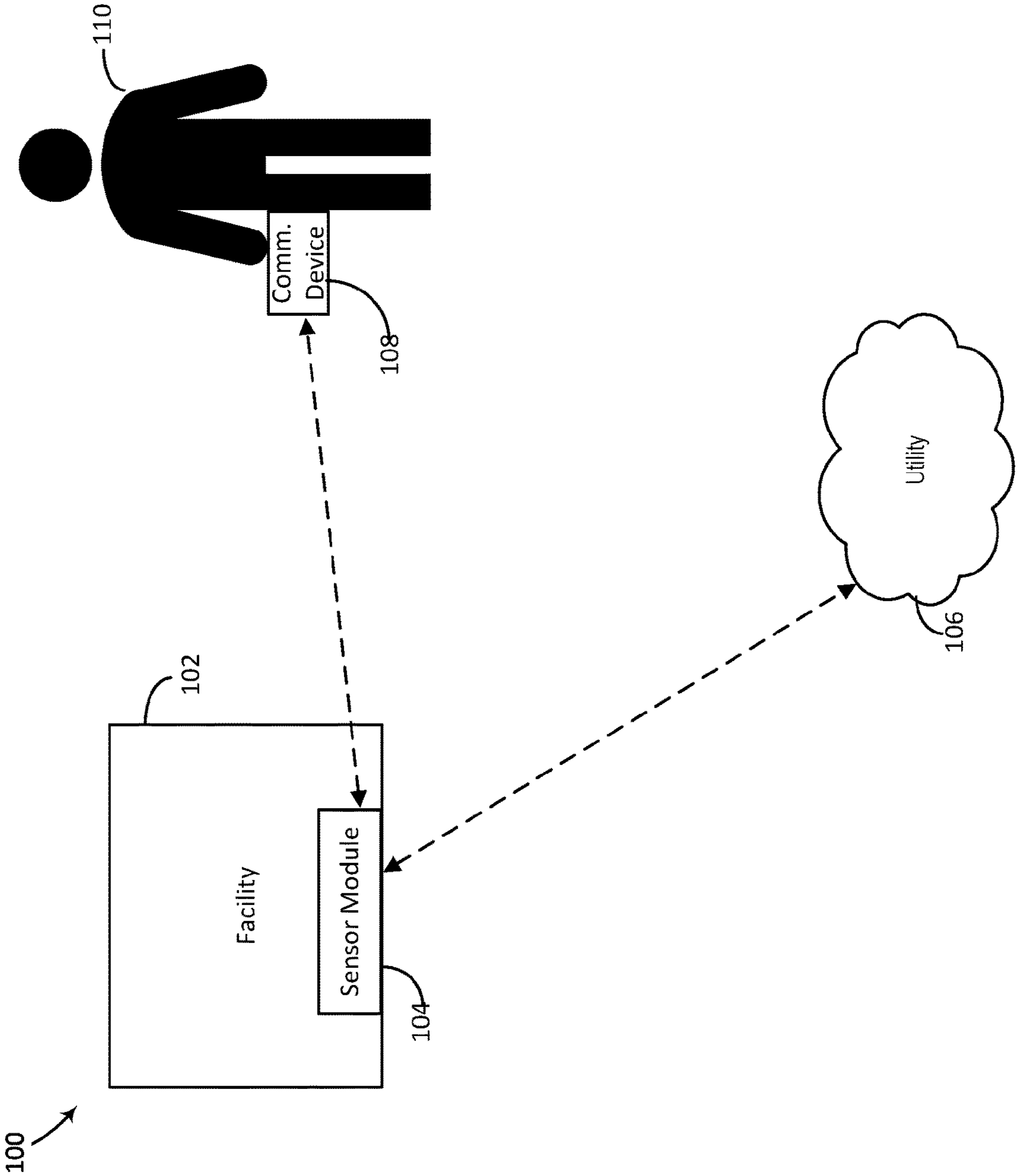
FIG. 1 is a diagram of a general utility system, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of other embodiments and of being practiced or of being carried out in various ways.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing specific functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" includes all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Also, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

FIG. 1 illustrates a general utility system 100, according to some embodiments. The system 100 may include a facility 102 have one or more connected utility sensor modules, such as sensor module 104. The facility 102 may include various types of facilities, such as commercial, residential, industrial, and the like. While the facility 102 is shown with only a single sensor module 104, it is understood that different facilities may have multiple sensor modules of various types. Example sensor modules 104 may include methane sensor modules, moisture sensor modules, temperature sensor modules, electrical arc detection modules, gas concentration sensor modules, water level sensor modules, water pressure sensors, gas pressure sensors, and/or other sensor modules as required for a given application.

The sensor module 104, as described above, may be configured to sense one or more parameters associated with a utility system, such as gas (e.g., methane), moisture, temperatures, currents, voltages, electrical arcs, water or other liquid levels, gas pressures, and/or other parameters associated with a given utility system. For purposes of this application, the sensor module 104 will generally be discussed with respect to a methane gas sensor. However, it is understood that other sensor types may be used in lieu of, or in addition to, a methane gas sensor. The sensor module 104 may be configured to communicate with a utility system 106. The utility system 106 may be or include a server or cloud-based system which allows the utility to monitor and/or control various aspects of an associated utility network. The utility system 106 may further include intermediate devices, such as communication hubs and data collection units ("DCUs"), which may serve as intermediaries to facilitate communication between the sensor module 104 and the utility system 106, and specifically to an end point of the utility system such as a server or cloud-based server system. As will be described in more detail below, the sensor module 104 may communicate with the utility via a wireless communication protocol.

The sensor module 104 may further communicate with a communication device 108 associated with a technician 110. The communication device 108 may be configured to provide one or more instructions or commands to the sensor module 104, as will be described in more detail below. The technician 110 may use the communication device 108 to communicate with the sensor module 104 to read sensor values, update software/firmware, or provide various instructions to the sensor module 104 as required for a given application, such as maintenance work, installation of equipment, etc. As will be described in more detail below, the communication device 108 may communicate with the sensor module 104 using various communication protocols. While not shown, it is contemplated that in some embodiments, the communication device 108 may further be configured to communicate with the utility system 106. In other embodiments, the technician 110 may communicate directly with the sensor module 104 via a user interface of the sensor module, as will be described in more detail below.

Figure 2:
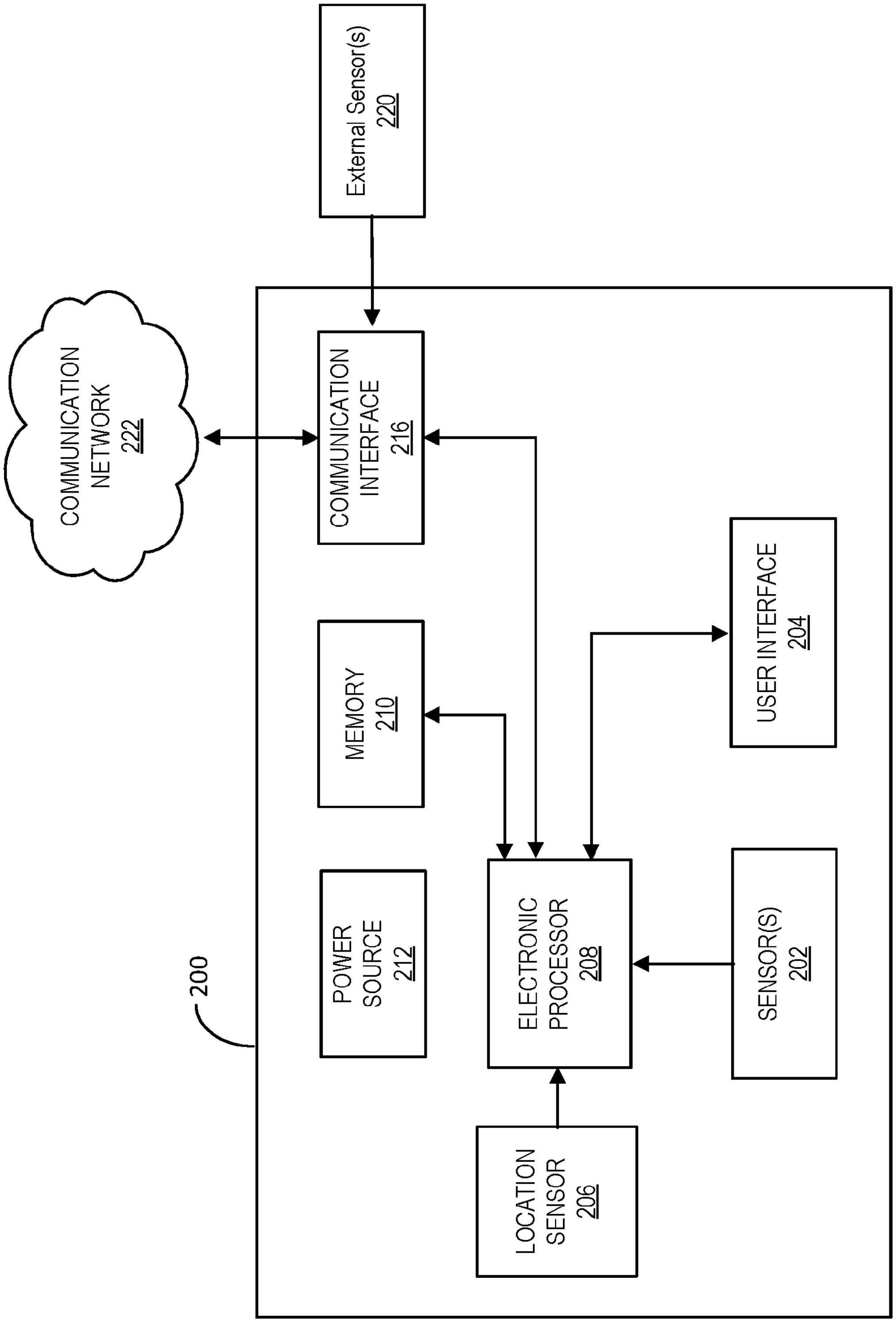
FIG. 2 is a block diagram of a utility sensor module, according to some embodiments.

FIG. 2 is a block diagram of a sensor module 200, according to some embodiments. The sensor module 200 may be similar to the sensor module 104 described above with respect to FIG. 1 and should be understood to be able to be used interchangeably herein. Each sensor module 200 may contain a housing (not shown) that is environmentally sealed. Such a housing may be manufactured with any suitable materials, including materials used for components used in exterior locations, such as external utility systems (meters, power lines, substations, etc.).

The sensor module 200 may include one or more sensors 202. The sensors 202 may include gas detection sensors, gas concentration sensors, pressure sensors, voltage sensors, current sensors, temperature sensors, light sensors, or other sensor as required for a given application. The sensor module 200 may further include a user interface 204. The user interface 204 may include one or more inputs to allow a user, such as a technician to control, modify, or otherwise provide instructions to the sensor module 200, as will be described in more detail below. In some examples, the user interface 204 may further include a display to provide a visual indication of one or more parameters of the sensor module 200, such as communication status, sensor readings, configuration data, and/or other information as appropriate for a given application. In some embodiments, the display may serve as both an input device and an output device, such as where the display is a touchscreen device. The sensor module 200 may further include a location sensor 206 (e.g., GPS, Glonass). The location sensor 206 may provide a location of the sensor module 200. In some examples, the display may simply include one or more indicators (e.g., LEDs) to provide an output to a user.

As illustrated in FIG. 2, the sensor module 200 further includes an electronic processor 208, a memory 210, a power source 212, and a communication interface 216. The sensors 202 and the location sensor 206 are configured to provide one or more sensed values to the electronic processor 208. The user interface 204 may both provide input to, and receive an output from, the electronic processor 208.

The memory 210 may include read only memory (ROM), random access memory (RAM), other non-transitory computer-readable media, or combinations thereof. The electronic processor 208 is configured to communicate with the memory 210 to store data and retrieve stored data. The electronic processor 208 is configured to receive instructions and data from the memory 210 and execute, among other things, various instructions, processes, applications, or the like. In particular, the electronic processor 208 executes instructions stored in the memory 210 to perform one or more of the processes described herein.

In one embodiment, the power source 212 is configured to provide power to the various components of the sensor module 200. In some embodiments, the sensor module 200 receives external power and the power source 212 converts and distributes the external power to the various components of the sensor module 200. In some examples, the power source 212 includes a battery. In some instances, the battery may be the sole power source, or may be configured to provide backup power when external power is not available.

The communication interface 216 (e.g., a transceiver) allows for communication between the electronic processor 208 and one or more external devices, such as one or more external sensors 220. The external sensors 220 may be remote sensors configured to operate with the sensor module 200, such as gas sensors, pressure sensors, moisture sensors, temperature sensors, or other sensors as described herein. The external sensors 220 may be used when the sensor module 200 cannot easily be placed in proximity to the required location of the sensor, or where the location of the sensor would prevent the sensor module 200 from being able to communicate with the utility network, or where the location of the sensor is within another component, such as a pipe. Additionally, the communication interface 216 may be configured to communicate with the sensor via a wired connection, and in some examples may provide power to the external sensor(s) 220, such as from the power source 212.

The communication interface 216 may further provide communication with other external devices, such as the utility system 106 (FIG. 1) via a communication network 222. The communication interface 216 may further be configured to communicate directly with one or more additional devices, such as the communication device 108 (FIG. 1). In some embodiments, the communication interface 216 may include separate transmitting and receiving components. In some embodiments, the communication interface 216 is a wireless transceiver that encodes information received from the electronic processor 208 into a carrier wireless signal and transmits the encoded wireless signal to one or more external devices and/or communication networks, as described above. The communication interface 216 also decodes information received from one or more external devices and provides the decoded information to the electronic processor 208.

The communication interface may communicate with devices and/or networks via various communication protocols, such as using a power line network or a wireless network (e.g., BLUETOOTH®, Wi-Fi, Wi-Max, cellular (3G, 4G, 5G, LTE), RF, LoRa, Zigbee, and/or other wireless communication protocols applicable to a given system or installation). In one embodiment, the communication interface 216 may use a proprietary wireless communication protocol, such as Aclara RF from Aclara Technologies, LLC. Furthermore, in one embodiment, the communication interface 216 may communicate using a combination of communication protocols, such as those described above. For example, the communication interface 216 may be configured to communication via a combination of cellular, BLUETOOTH, and a power line network, thereby allowing for the communication interface to communicate with multiple devices, such as the communication network 222, the external sensors 220, and/or the communication device 108 (FIG. 1). However, other combination of communication protocols are also applicable as appropriate for a given application. In some examples, the sensor module 200 may include multiple communication interfaces 216. For example, one communication interface 216 may be configured to communicate with local devices, such as external sensors and/or user communication devices 300 (FIG. 3) and a second communication interface 216 may be configured to communication with the communication network 222.

Figure 3:
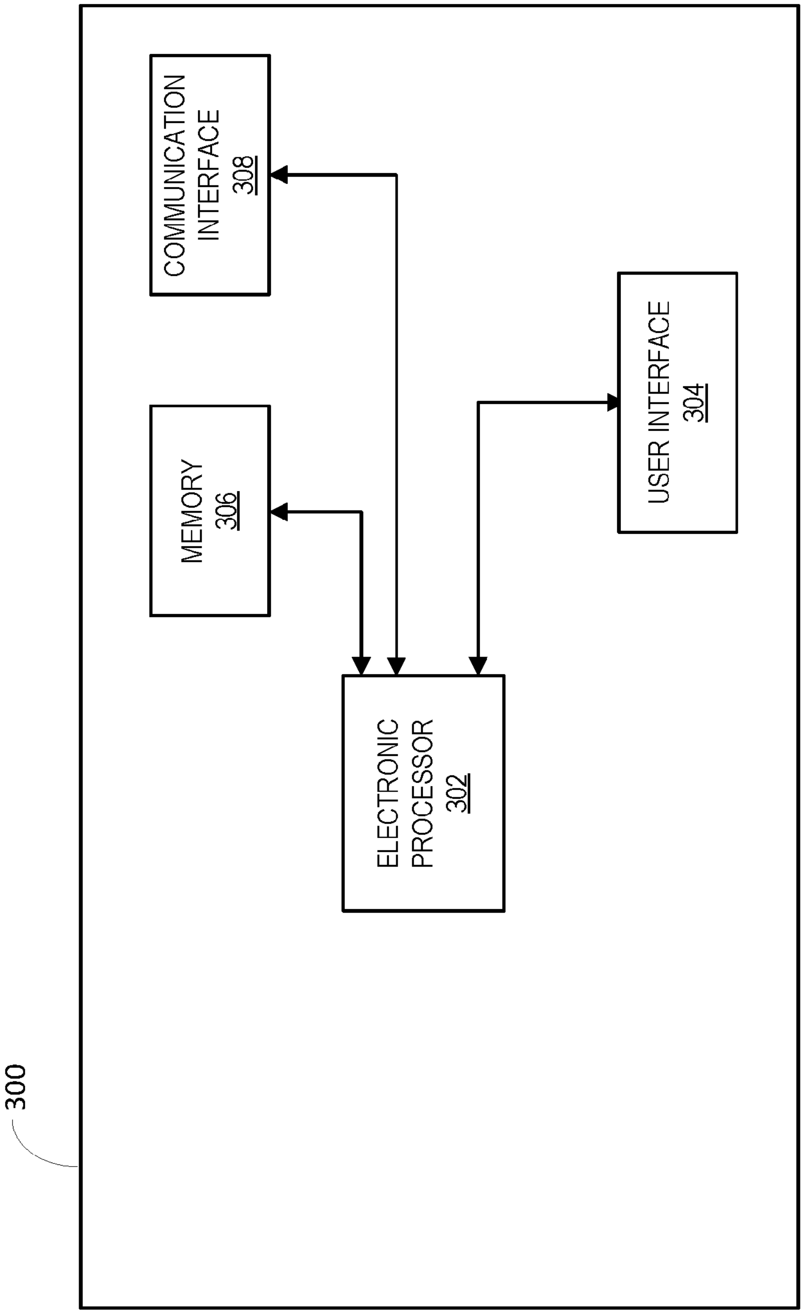
FIG. 3 is a block diagram of a communication device, according to some embodiments.

Turning now to FIG. 3, a block diagram illustrating an example communication device 300 is shown, according to some embodiments. The communication device 300 may be similar to the communication device 108 (FIG. 1) and should be understood to be interchangeable herein. The communication device 300 may include an electronic processor 302, a user interface 304, a memory 306, and a communication interface 308. The memory 306 may include read only memory (ROM), random access memory (RAM), other non-transitory computer-readable media, or combinations thereof. The electronic processor 302 is configured to communicate with the memory 306 to store data and retrieve stored data. The electronic processor 302 may be further configured to receive instructions and data from the memory 306 and execute, among other things, various instructions, processes, application, etc. In particular, the electronic processor 302 executes instructions stored in the memory 306 to perform one or more of the processes described herein.

The communication interface 308 (e.g., a transceiver) allows for communication between the electronic processor 302 and one or more external devices, such as one or more sensor modules 200 (FIG. 2). While not shown, in some examples, the communication interface 308 may communicate with a communication network, such as communication network 222 (FIG. 2), to allow for communication with a utility system, such as utility system 106 (FIG. 1). The communication interface 308 may communicate with the sensor module 200 (FIG. 2) via the communication interface 216 of the sensor module 200. The communication interface 308 may also communicate with devices and/or networks via various communication protocols, such as using a power line network or a wireless network (e.g., BLUETOOTH®, Wi-Fi, Wi-Max, cellular (3G, 4G, 5G, LTE), RF, LoRa, Zigbee, and/or other wireless communication protocols applicable to a given system or installation). In one embodiment, the communication interface 308 may use a proprietary wireless communication protocol, such as Aclara RF from Aclara Technologies, LLC. Furthermore, in one embodiment, the communication interface 308 may communicate using a combination of communication protocols, such as those described above. In some examples, the communication device may include multiple communication interfaces 308. For example, a first communication interface 308 may be configured to communicate with local devices, such as sensor modules 200 and a second communication interface 308 may be configured to communication with a network, such as the communication network 222 described above.

The user interface 304, may allow a user, such as a technician, to receive outputs from the communication device 300 or provide inputs to the communication device 300. In one example, the communication device 300 may receive data from a sensor module 200 (FIG. 2) and display the data via the user interface 304. In further examples, the user may enter various commands (e.g., enter pause mode), or data (e.g., configuration data, communication data, calibration data, firmware updates, etc.) via the user interface 304, which may then be communicated to the sensor module 200 (FIG. 2). The sensor module 200 (FIG. 2) may then provide data such as an acknowledgement signal, parameter changes, etc. back to the communication device 300, which can be viewed at the user interface 304. In some examples, the user interface 304 may be a touchscreen device, such as a capacitive touchscreen, an inductive touchscreen, a resistive touchscreen, or other touchscreen type as required for a given application. Thus, the touchscreen can allow for both user inputs, as well as visualization of outputs. In other embodiments, the user interface 304 may include only a display screen and then one or more inputs (e.g., a keyboard, various buttons, softkeys, etc.) to allow the user to provide an input to the communication device 300.

Figure 4:
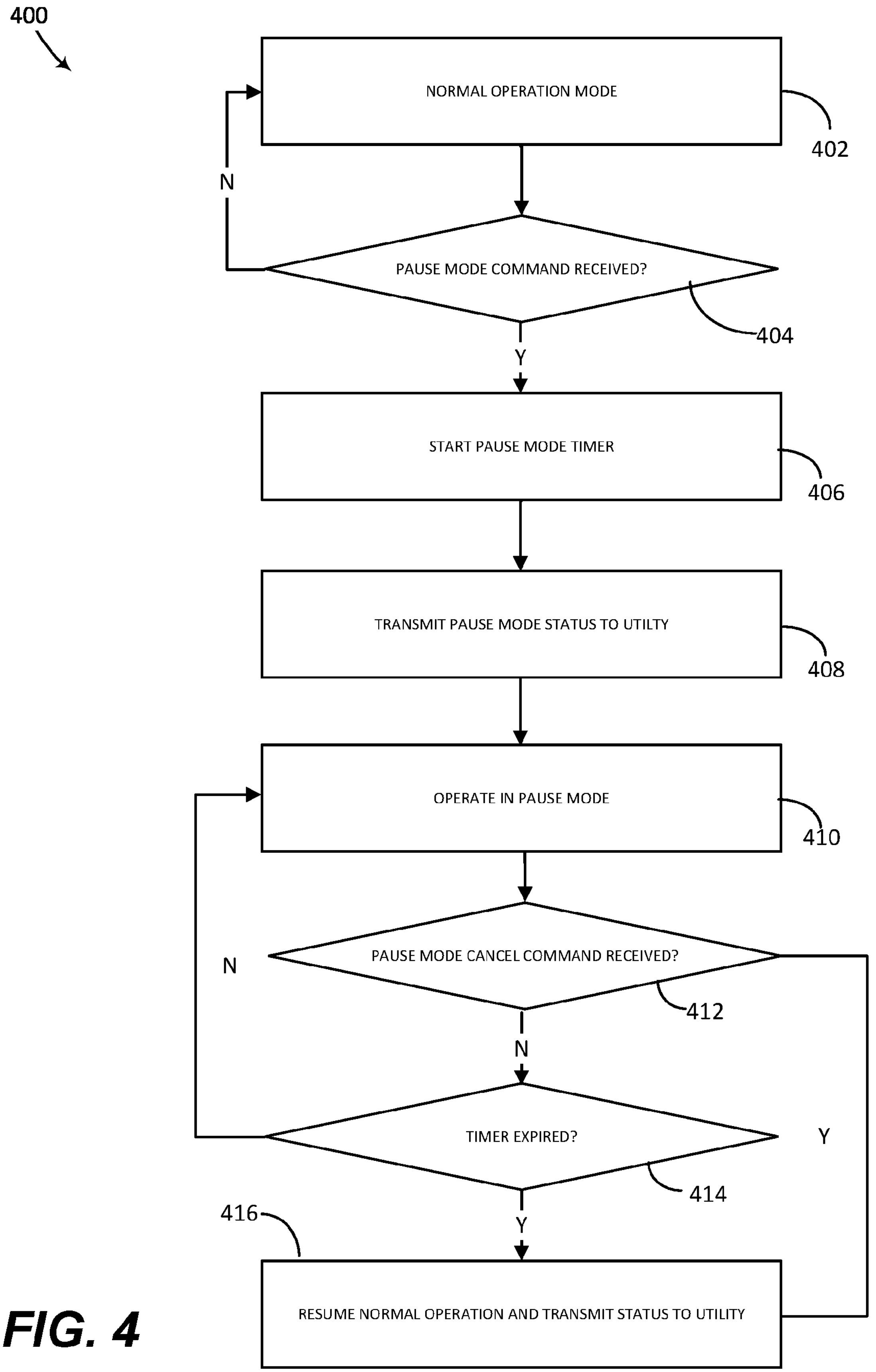
FIG. 4 is a flow chart illustrating a process for controlling a mode of the utility sensor module of FIG. 2, according to some embodiments.

Turning now to FIG. 4, a flowchart illustrating a process 400 for a pause mode operation of a sensor module, such as sensor module 200 (FIG. 2) is shown, according to some embodiments. As such, the process 400 is executed by the sensor module 200 (FIG. 2), except where otherwise noted. For example, the process 400 may be stored in the memory 210 (FIG. 2) and executed by the electronic processor 208 (FIG. 2).

At process block 402, the sensor module 200 operates in a normal operation mode. The normal operation mode may be the standard operating mode for the sensor module. In one example, during the normal operation mode, the sensor module 200 monitors one or more parameters of a facility utility system via the sensors 202 and/or the external sensors 220. The sensor module 200 may further be configured to generate alarms in response to one or more of the sensed parameters exceeding a predetermined value when in the normal operation mode. For example, the sensor module 200 may generate an alarm in response to a detected methane level exceeding a predetermined threshold value. In some embodiments, the generated alarm may be transmitted to other devices, such as the utility system 106 (FIG. 1), via communication interface 216.

At process block 404, the sensor module 200 determines whether a pause mode command has been received. The pause mode command may be issued by a communication device, such as communication device 300 (FIG. 3). In one embodiment, a user instructs the communication device 300 to transmit a pause mode command to the sensor module 200, such as via the user interface 304. In other examples, the user may provide the pause mode command to the sensor module 200 via the user interface 204 of the sensor module 200 directly, such by actuating or operating one or more inputs of the user interface 204. In some examples, the user causes the pause mode command to be generated when they will be doing work, such as meter installation, maintenance, etc., which may result in an alarm being unnecessarily generated by the sensor module. For example, when installing a new gas meter, some methane may escape during the process, which could result in an alarm being generated. As noted above, the alarm may be received by the utility system 106, which may then dispatch additional personnel such as maintenance technicians and/or emergency responders. This situation is not desirable when performing the required work, and therefore the pause mode command is transmitted by a user to temporary cease any alarms being generated by the sensor module 200, as will be described in more detail below.

In response to determining that the pause mode command was not received, the sensor module 200 continues operating in the normal operation mode at process block 402. In response to determining that the pause mode command was received, the sensor module 200 initiates a pause mode timer at process block 406. The pause mode timer represents the amount of time in which the sensor module 200 will remain in the pause mode. In some examples, the pause mode timer is set to a predefined default value. In some examples, the predefined default value is 60 minutes. However, predefined default values of more than 60 minutes or less than 60 minutes are also contemplated as required for a given application. In other examples, a user may be able to set the pause mode time, such as via the communication device 300 (FIG. 3). For example, for a given job, the user may set the pause timer to a value sufficient to complete the required job. In some instances, the user may not be able to set the pause mode timer to a value that exceeds a maximum value. For example, the user may not be able to set the pause mode timer to a value greater than 240 minutes. However, maximum values of more than 240 minutes or less than 240 minutes are also contemplated, as appropriate for a given application. In some instances, the pause timers may be automatically set by the communication device 300 (FIG. 3) based on a time associated with a required work order that is being performed.

At process block 408, the sensor module 200 enters the pause mode and transmits the mode change status to the utility system 106 (FIG. 1). In one embodiment, the mode change status includes information such as the current mode (e.g., pause mode), the pause mode timer value, the time the mode was changed, and/or other data as required for a given application. The sensor module 200 then operates in the pause mode at process block 410. As noted above, when operating in the pause mode, the sensor module 200 does not generate or transmit alarms to the utility system 106 (FIG. 1). In some examples, operating in the pause mode may still allow for some alarms to be generated, but may require a higher threshold to generate the alarm. For example, where the sensor module 200 monitors methane (or other noxious gasses), an alarm may still be generated if the sensed gas concentration exceeds an upper limit, which is higher than a normal alarm threshold value. In some specific examples, a typical methane concentration alarm threshold is 10% LEL (Lower Explosive Limit), which may generate an initial alarm to dispatch first responders and maintenance personnel. At 20% LEL, a secondary alarm may be generated indicating that the building or structure should be evacuated. Thus, in the above example, the 10% LEL alarm may be disabled when the sensor module 200 is operating in the pause mode, but upon the 20% LEL alarm threshold being reached, the sensor module 200 may override the pause mode to transmit the alarm to the utility system 106.

In some embodiments, the mode change to operation in the pause mode only affects alarms that would generally result in personnel, such as maintenance and/or first responders, being dispatched. Lower priority alarms, such as low battery, over temperature, communication failure, etc., may not be subject to being disabled during operation in the pause mode.

At process block 412, the sensor module 200 determines whether a pause mode cancel command has been received. Similar to the pause mode command, a user may cause the communication device 300 to transmit a pause mode cancel command to the sensor module or may directly input the pause mode cancel command via the user interface 204 (FIG. 2) of the sensor module 200. For example, the user may cause the pause mode cancel command to be received by the sensor module 200 in response to completing the required work. In response to determining that the pause mode cancel command was received, the sensor module 200 resumes normal operation and transmits the mode status to the utility system 106 (FIG. 1) at process block 414. This allows the utility system 106 (FIG. 1) to register that the sensor module 200 is back in normal operation.

In response to determining that the pause mode cancel command was not received at process block 412, the sensor module 200 determines whether the pause mode timer has expired at process block 414. In response to determining that the pause mode timer has not expired, the sensor module 200 continues to operate in the pause mode at process block 410. In response to determining that the pause mode time has expired, the sensor module 200 resumes normal operation and transmits the mode status to the utility at process block 416, as described above.

Figure 5:
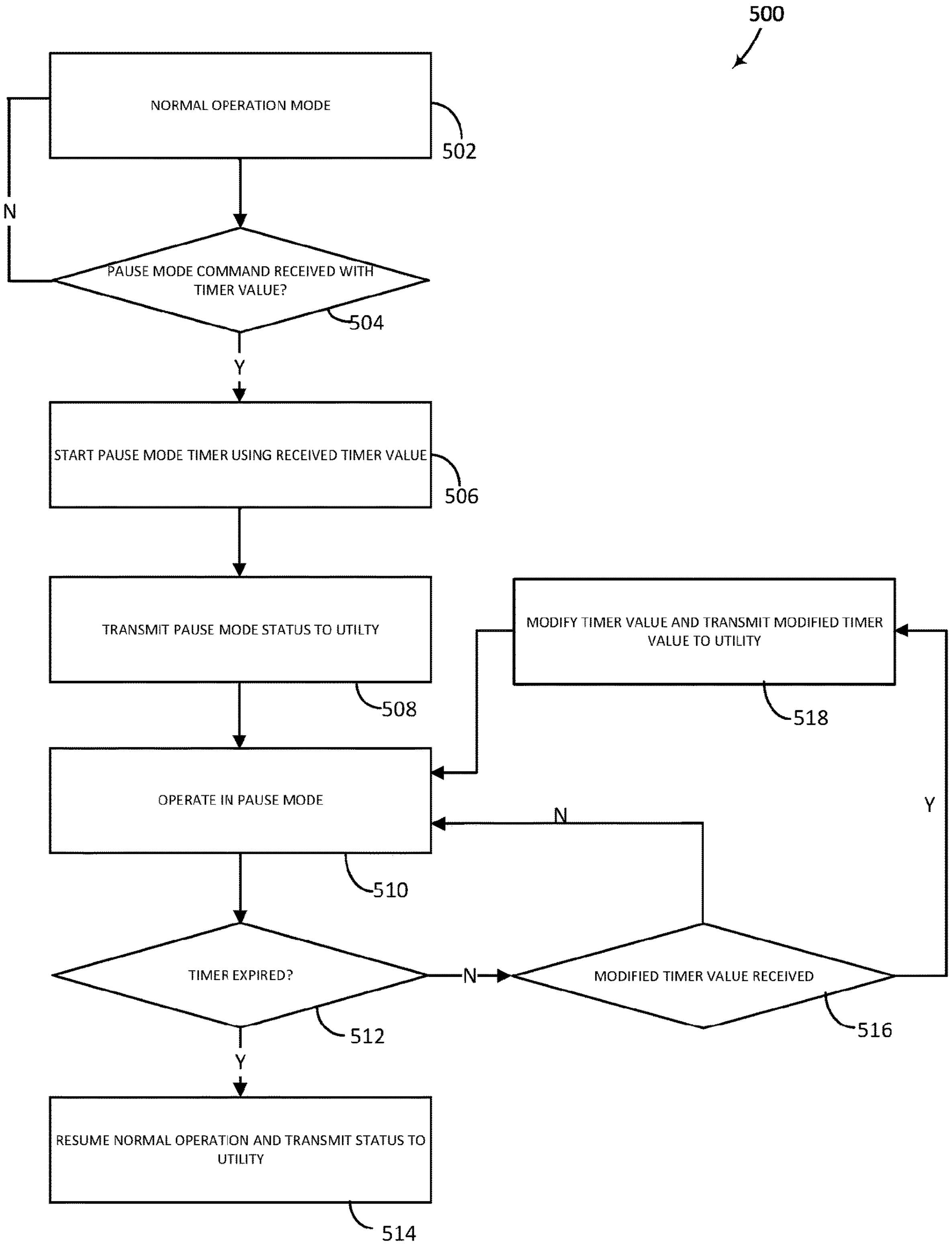
FIG. 5 is a flow chart illustrating a further process for controlling a mode of the utility sensor module of FIG. 2, according to some embodiments.

FIG. 5 is a flow chart illustrating a process 500 for modifying a pause mode timer of a sensor module 200, according to some embodiments. Similar to the process 400 (FIG. 4) described above, the process 500 is executed by the sensor module 200 (FIG. 2), except where otherwise noted. For example, the process 500 may be stored in the memory 210 (FIG. 2) and executed by the electronic processor 208 (FIG. 2).

At process block 502, the sensor module 200 operates in a normal operation mode. The normal operation mode may be the standard operating mode for the sensor module. In one example, during the normal operation mode, the sensor module 200 monitors one or more parameters of a facility utility system via the sensors 202 and/or the external sensors 220. The sensor module 200 may further be configured to generate alarms in response to one or more of the sensed parameters exceeding a predetermined value. For example, the sensor module 200 may generate an alarm in response to a detected methane level exceeding a predetermined threshold value. In some embodiments, the generated alarm may be transmitted to other devices such as the utility system 106 (FIG. 1), such as via communication interface 216.

At process block 504, the sensor module 200 determines whether a pause mode command has been received. The pause mode command may be issued by a communication device, such as communication device 300 (FIG. 3). In one embodiment, a user instructs the communication device 300 to transmit a pause mode command to the sensor module 200, such as via the user interface 304. In other examples, the user may provide the pause mode command to the sensor module 200 via the user interface 204 of the sensor module 200 directly, such by actuating or operating one or more inputs of the user interface 204.

In response to determining that the pause mode command was not received, the sensor module 200 continues operating in the normal operation mode at process block 502. In response to determining that the pause mode command was received, the sensor module 200 initiates a pause mode timer at process block 506. The pause mode timer represents the amount of time in which the sensor module 200 will remain in the pause mode. In some examples, the pause mode timer is set to a predefined default value. In some examples, the predefined default value is 60 minutes. However, predefined default values of more than 60 minutes or less than 60 minutes are also contemplated as required for a given application. In other examples, a user may be able to set the pause mode time, such as via the communication device 300 (FIG. 3). For example, for a given job, the user may set the pause timer to a value sufficient to complete the required job. In some instances, the user may not be able to set the pause mode timer to a value that exceeds a maximum value. For example, the user may not be able to set the pause mode timer to a value greater than 240 minutes. However, maximum values of more than 240 minutes or less than 240 minutes are also contemplated, as appropriate for a given application. In some instances, the pause timers may be automatically set by the communication device 300 (FIG. 3) based on a time associated with a required work order that is being performed.

At process block 508, the sensor module 200 enters the pause mode and transmits the mode change status to the utility system 106 (FIG. 1). In one embodiment, the mode change status includes information such as the current mode (e.g., pause mode), the pause mode timer value, the time the mode was changed, and/or other data as required for a given application. The sensor module 200 then operates in the pause mode at process block 510. As noted above, when operating in the pause mode, the sensor module 200 does not generate or transmit alarms to the utility system 106 (FIG. 1). In some examples, operating in the pause mode may still allow for some alarms to be generated, but may require a higher threshold to generate the alarm. For example, where the sensor module 200 monitors methane (or other noxious gasses), an alarm may still be generated if the sensed gas concentration exceeds an upper limit, which is higher than a normal alarm threshold value.

At process block 512, the sensor module 200 determines whether the pause mode timer has expired. In response to determining that the pause mode timer has expired, the sensor module 200 resumes normal operation and transmits the mode status to the utility at process block 514, as described above.

In response to determining that the pause mode timer has not expired, the sensor module 200 determines whether a modified pause timer value has been received at process block 516. Similar to the pause mode command, the modified timer value may be received at the sensor module 200 from the communication device 300 (FIG. 3). For example, a user may input a modified timer value using the user interface 304 (FIG. 3) of the communication device 300, which can then be caused to transmit the modified timer value to the sensor module 200. In other examples, a user may input the modified pause timer value directly into the sensor module 200, such as via the user interface 204 (FIG. 2). The user may modify the pause timer value to be either greater than the initial value or less than the initial value. For example, the user may determine that the job will take additional time and extend the pause timer value. In other examples, the user may determine that the job will not take as long as expected and will reduce the pause timer value. For example, where a user finishes the job prior to the pause timer expiring, the user may send a command to the sensor module 200, such as via the user interface 204 (FIG. 2), to set the pause timer value to 0. Additionally, the pause timer may also have a maximum value which the user is not allowed to exceed. In some embodiments, the maximum value may be a value 2x the initial pause mode timer value. However, other maximum values are also contemplated.

In response to determining that a modified timer value is not received, the sensor module 200 continues to operate in the pause mode at process block 510. In response to determining that a modified timer value was received, the sensor module 200 modifies the timer value and transmits the modified timer value to the utility system (FIG. 1) at process block 518. Upon modifying the timer value, the sensor module 200 operates in pause mode at process block 510 using the modified timer value, and continues operation as described above.

Figure 6:
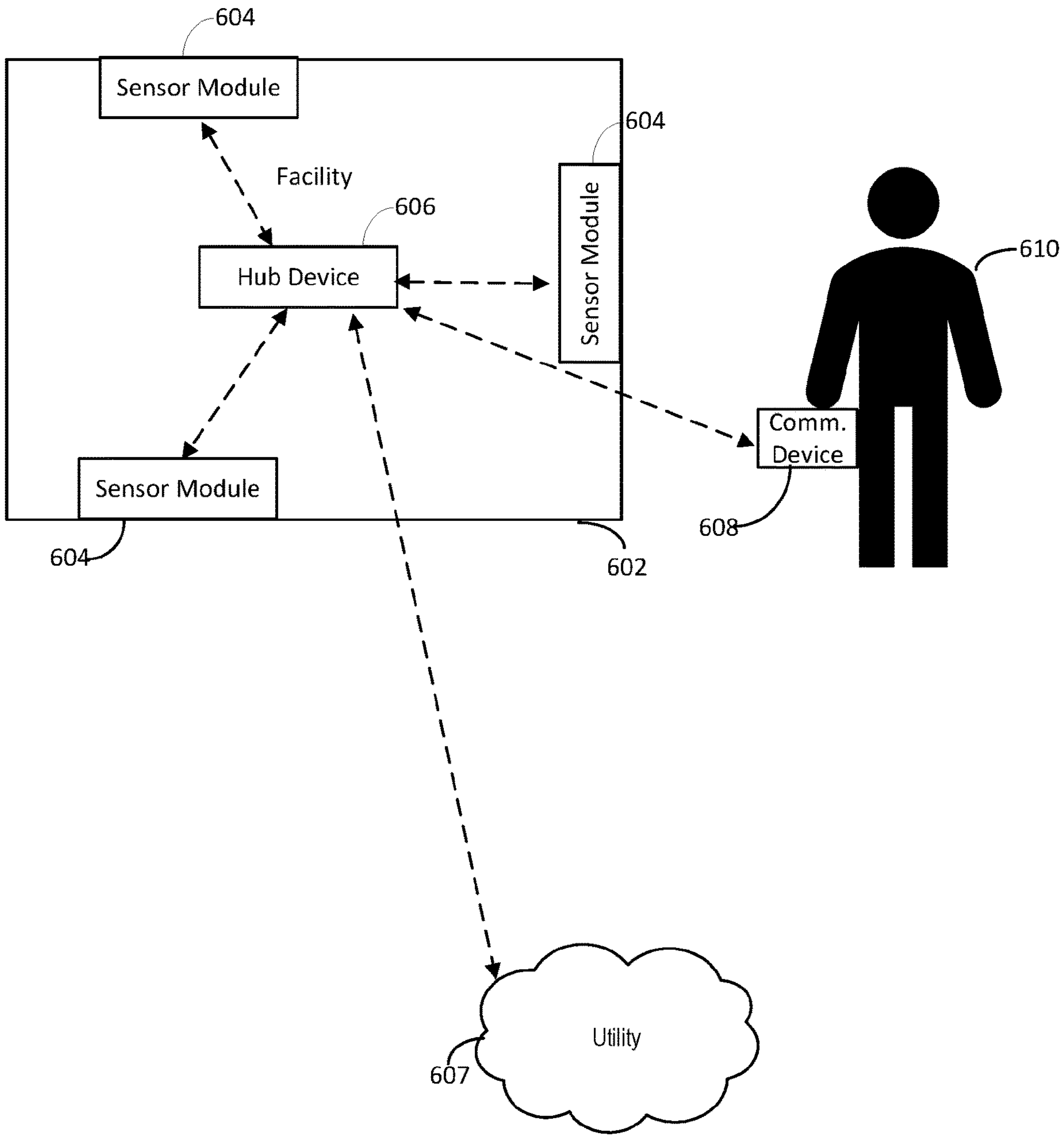
FIG. 6 is a block diagram of an alternate general utility system.

FIG. 6 illustrates an alternate example of a general utility system 600, according to some embodiments. The system 600 may include a facility 602 have one or more connected utility sensor modules 604. The sensor modules 604 may the same as sensor modules 104/200 described above, and should be understood to be used interchangeably herein. The facility further includes one or more hub devices 606. The hub devices 606 may be configured to communicate to the sensor modules 604. The facility 602 may include various types of facilities, such as commercial, residential, industrial, and the like. While the facility 602 is shown with only three sensor modules 604, it is understood that different facilities may have multiple sensor modules of various types. Example sensor modules 604 may include methane sensor modules, moisture sensor modules, temperature sensor modules, electrical arc detection modules, gas concentration sensor modules, water level sensor modules, water pressure sensors, gas pressure sensors, and/or other sensor modules as required for a given application.

The sensor module 604, as described above, may be configured to sense one or more parameters associated with a utility system, such as gas (e.g., methane), moisture, temperatures, currents, voltages, electrical arcs, water or other liquid levels, gas pressures, and/or other parameters associated with a given utility system. For purposes of this application, the sensor module 604 will generally be discussed with respect to a methane gas sensor. However, it is understood that other sensor types may be used in lieu of, or in addition to, a methane gas sensor. The sensor module 604 may be configured to communicate with a utility system 607. The utility system 607 may be or include a server or cloud-based system which allows the utility to monitor and/or control various aspects of an associated utility network. The utility system 607 may further include intermediate devices, such as communication hubs and data collection units ("DCUs"), which may serve as intermediaries to facilitate communication between the sensor modules 604 and the utility system 607, and specifically to an end point of the utility system such as a server or cloud-based server system.

The sensor modules 604 may further communicate with the hub device 606. The hub device 606 is configured to facilitate communication between the sensor modules 604 and other devices such as the utility system 607 and or a communication device 608 associated with a technician 610. For example, an alarm generated by any one of the sensor modules 604 may be communicated to the utility system 607 via the hub device. Further, the hub device 606 may receive instructions from the communication device 608, as will be described in more detail below. The communication device 608 may be similar to communication device 300 described above, and should be understood to be used interchangeably herein.

The communication device 608 may be configured to provide one or more instructions or commands to the hub device 606, as will be described in more detail below. The technician 610 may use the communication device 608 to communicate with the hub device 606 to obtain information from the sensor modules 604 to read sensor values, update software/firmware, or provide various instructions to the sensor modules 604 as required for a given application, such as maintenance work, installation of equipment, etc. As will be described in more detail below, the communication device 608 may communicate with the hub device 606 using various communication protocols. In turn, the hub device 606 may communicate with the sensor modules 604 using one or more wireless communication protocols as described herein. While not shown, it is contemplated that in some embodiments, the communication device 608 may further be configured to communicate with the utility system 607. In other embodiments, the technician 610 may communicate directly with the sensor modules 604 via a user interface of the sensor modules 604, as will be described in more detail below.

Figure 7:
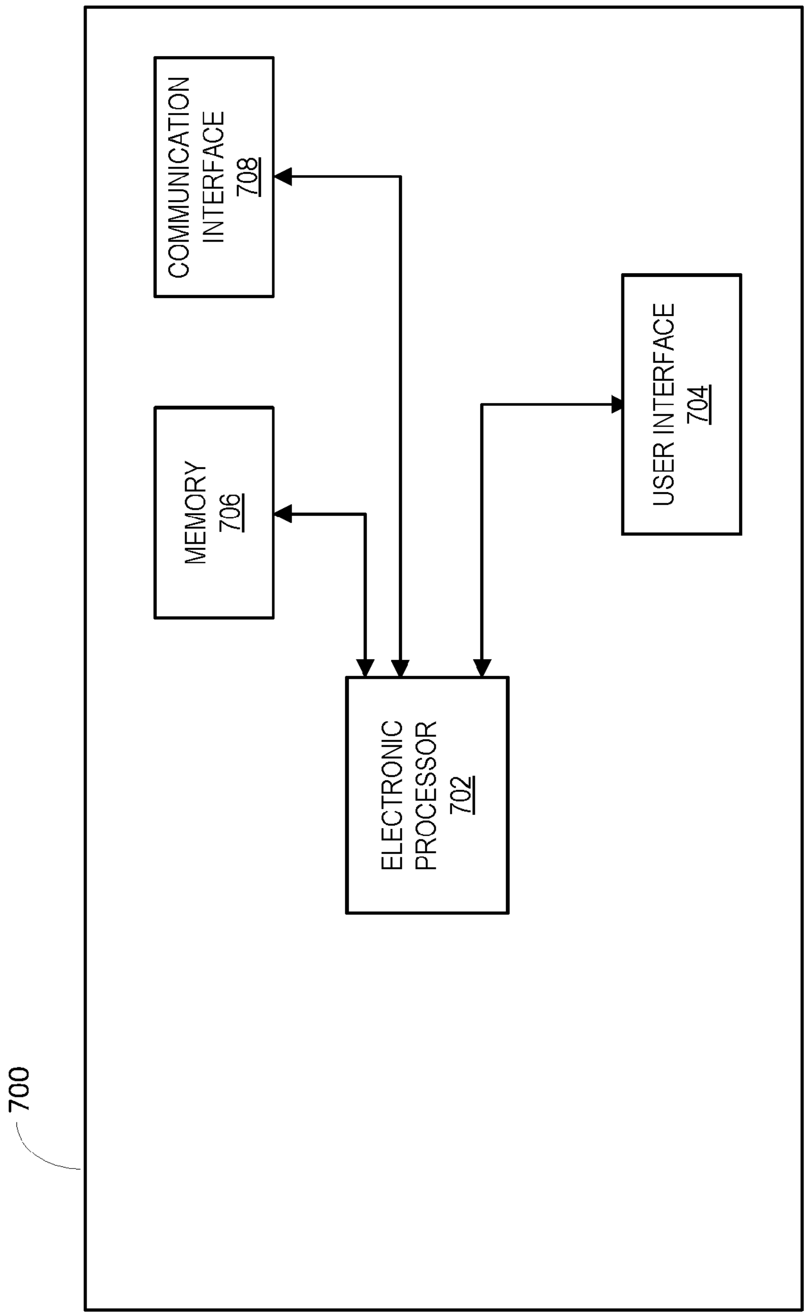
FIG. 7 is a block diagram illustrating an example hub device of FIG. 6.

Turning now to FIG. 7, a block diagram illustrating an example hub device 700 is shown, according to some embodiments. The hub device 700 may be similar to the hub device 606 (FIG. 6) and should be understood to be interchangeable herein. The hub device 700 may include an electronic processor 702, a user interface 704, a memory 706, and a communication interface 708. The memory 706 may include read only memory (ROM), random access memory (RAM), other non-transitory computer-readable media, or combinations thereof. The electronic processor 702 is configured to communicate with the memory 706 to store data and retrieve stored data. The electronic processor 702 may be further configured to receive instructions and data from the memory 706 and execute, among other things, various instructions, processes, application, etc. In particular, the electronic processor 702 executes instructions stored in the memory 706 to perform one or more of the processes described herein.

The communication interface 708 (e.g., a transceiver) allows for communication between the electronic processor 702 and one or more external devices, such as one or more sensor modules 200 (FIG. 2) and/or communication device 300 (FIG. 3). While the sensor modules and communication device as described with respect to FIG. 7 general refer to the sensor module 200 of FIG. 2 and the communication device 300 of FIG. 3, it is understood that these devices may be used interchangeably with the sensor modules 604 and communication device 608 of FIG. 6. While not shown, in some examples, the communication interface 708 may communicate with a communication network, such as communication network 222 (FIG. 2), to allow for communication with a utility system, such as utility system 106 (FIG. 1) and/or utility system 607 (FIG. 6). The communication interface 708 may communicate with the sensor modules 200 (FIG. 2) via the communication interface 216 (FIG. 2) of the sensor module 200. The communication interface 708 may also communicate with devices and/or networks via various communication protocols, such as using a power line network or a wireless network (e.g., BLUETOOTH®, Wi-Fi, Wi-Max, cellular (3G, 4G, 5G, LTE), RF, LoRa, Zigbee, and/or other wireless communication protocols applicable to a given system or installation). In one embodiment, the communication interface 708 may use a proprietary wireless communication protocol, such as Aclara RF from Aclara Technologies, LLC. Furthermore, in one embodiment, the communication interface 708 may communicate using a combination of communication protocols, such as those described above. In some examples, the communication device may include multiple communication interfaces 708. For example, a first communication interface 708 may be configured to communicate with local devices, such as sensor modules 200 (FIG. 2) and/or communication devices 300 (FIG. 3) and a second communication interface 708 may be configured to communication with a network, such as the communication network 222 described above.

Figure 8:
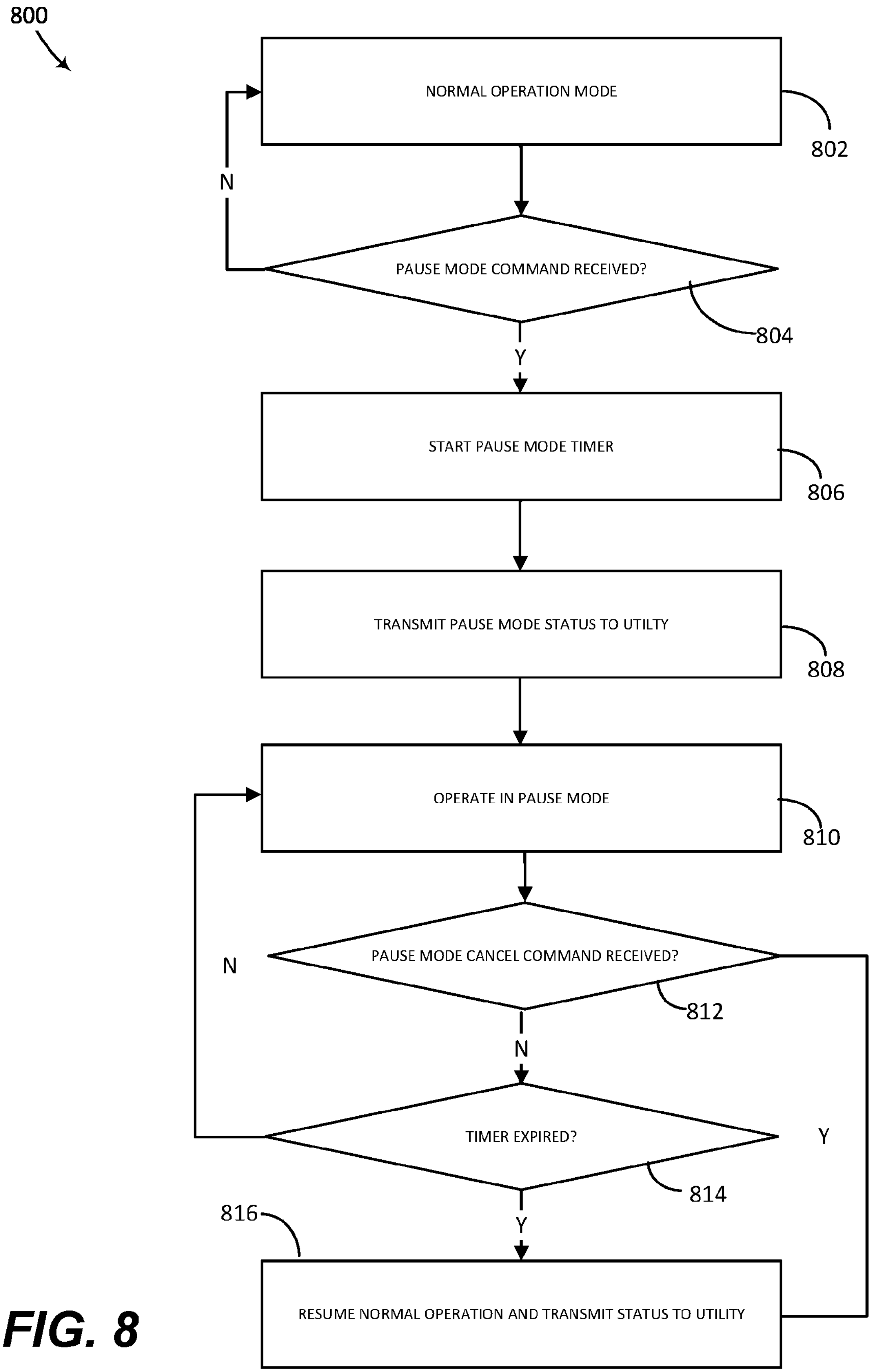
FIG. 8 is a flowchart illustrating a process for a pause mode operation of a hub device.

Turning now to FIG. 8, a flowchart illustrating a process 800 for a pause mode operation of a hub device, such as hub device 700 (FIG. 7) is shown, according to some embodiments. As such, the process 800 is executed by the hub device 700 (FIG. 7), except where otherwise noted. For example, the process 800 may be stored in the memory 706 (FIG. 7) and executed by the electronic processor 702 (FIG. 7).

At process block 802, the hub device 700 operates in a normal operation mode. The normal operation mode may be the standard operating mode for the hub device 700. In one example, during the normal operation mode, the hub device 700 monitors one or more sensor modules of a facility utility system, such as sensor modules 200 (FIG. 2) via one or more communication protocols. The sensor module 200 may further be configured to generate alarms in response to one or more of the sensed parameters exceeding a predetermined value when in the normal operation mode. For example, the sensor modules 200 may generate an alarm in response to a detected methane level exceeding a predetermined threshold value. The alarms are transmitted to the hub device 700 for communication to other devices, such as the utility 106.

At process block 804, the hub device 700 determines whether a pause mode command has been received. The pause mode command may be issued by a communication device, such as communication device 300 (FIG. 3). In one embodiment, a user instructs the communication device 300 to transmit a pause mode command to the hub device 700, such as via the user interface 304, for one or more sensor modules 200. In other examples, the user may provide the pause mode command to the hub device 700 via the user interface 704 of the hub device 700 directly, such by actuating or operating one or more inputs of the user interface 704. In some examples, the user causes the pause mode command to be generated when they will be doing work, such as meter installation, maintenance, etc., which may result in an alarm being unnecessarily generated by a sensor module 200. For example, when installing a new gas meter, some methane may escape during the process, which could result in an alarm being generated. As noted above, the alarm may be received by the hub device 700, which in turn communicates the alarm to the utility system 106, which may then dispatch additional personnel such as maintenance technicians and/or emergency responders. This situation is not desirable when performing the required work, and therefore the pause mode command is transmitted by a user to temporary cease any alarms being generated by the hub device 700, as will be described in more detail below.

In response to determining that the pause mode command was not received, the hub device 700 continues operating in the normal operation mode at process block 802. In response to determining that the pause mode command was received, the hub device 700 initiates a pause mode timer at process block 806. The pause mode timer represents the amount of time in which the hub device 700 will remain in the pause mode. In some examples, the pause mode timer is set to a predefined default value. In some examples, the predefined default value is 60 minutes. However, predefined default values of more than 60 minutes or less than 60 minutes are also contemplated as required for a given application. In other examples, a user may be able to set the pause mode time, such as via the communication device 300 (FIG. 3). For example, for a given job, the user may set the pause timer to a value sufficient to complete the required job. In some instances, the user may not be able to set the pause mode timer to a value that exceeds a maximum value. For example, the user may not be able to set the pause mode timer to a value greater than 240 minutes. However, maximum values of more than 240 minutes or less than 240 minutes are also contemplated, as appropriate for a given application. In some instances, the pause timers may be automatically set by the communication device 300 (FIG. 3) based on a time associated with a required work order that is being performed.

At process block 808, the hub device 700 enters the pause mode and transmits the mode change status to the utility system 106 (FIG. 1). In one embodiment, the mode change status includes information such as the current mode (e.g., pause mode), the pause mode timer value, the time the mode was changed, and/or other data as required for a given application. The hub device 700 then operates in the pause mode at process block 810. As noted above, when operating in the pause mode, the hub device 700 does not transmit alarms received from the sensor modules 200 associated with the pause mode to the utility system 106 (FIG. 1). In some examples, operating in the pause mode may still allow for some alarms to be generated, but may require a higher threshold to generate the alarm. For example, where the hub device 700 monitors methane (or other noxious gasses), an alarm may still be generated if the sensed gas concentration exceeds an upper limit, which is higher than a normal alarm threshold value. In some specific examples, a typical methane concentration alarm threshold is 10% LEL (Lower Explosive Limit), which may generate an initial alarm to dispatch first responders and maintenance personnel. At 20% LEL, a secondary alarm may be generated indicating that the building or structure should be evacuated. Thus, in the above example, the 10% LEL alarm may be disabled when the hub device 700 is operating in the pause mode, but upon the 20% LEL alarm threshold being reached, the hub device 700 may override the pause mode to transmit the alarm to the utility system 106.

In some embodiments, the mode change to operation in the pause mode only affects alarms that would generally result in personnel, such as maintenance and/or first responders, being dispatched. Lower priority alarms, such as low battery, over temperature, communication failure, etc., may not be subject to being disabled during operation in the pause mode.

At process block 812, the hub device 700 determines whether a pause mode cancel command has been received. Similar to the pause mode command, a user may cause the communication device 300 to transmit a pause mode cancel command to the hub device 700 or may directly input the pause mode cancel command via the user interface 704 (FIG. 7) of the hub device 700. For example, the user may cause the pause mode cancel command to be received by the hub device 700 in response to completing the required work. In response to determining that the pause mode cancel command was received, the hub device 700 resumes normal operation and transmits the mode status to the utility system 106 (FIG. 1) at process block 816. This allows the utility system 106 (FIG. 1) to register that the hub device 700 and the associated sensor modules 200 are back in normal operation.

In response to determining that the pause mode cancel command was not received at process block 812, the hub device 700 determines whether the pause mode timer has expired at process block 814. In response to determining that the pause mode timer has not expired, the hub device 700 continues to operate in the pause mode at process block 810. In response to determining that the pause mode time has expired, the hub device 700 resumes normal operation and transmits the mode status to the utility at process block 816, as described above.

Figure 9:
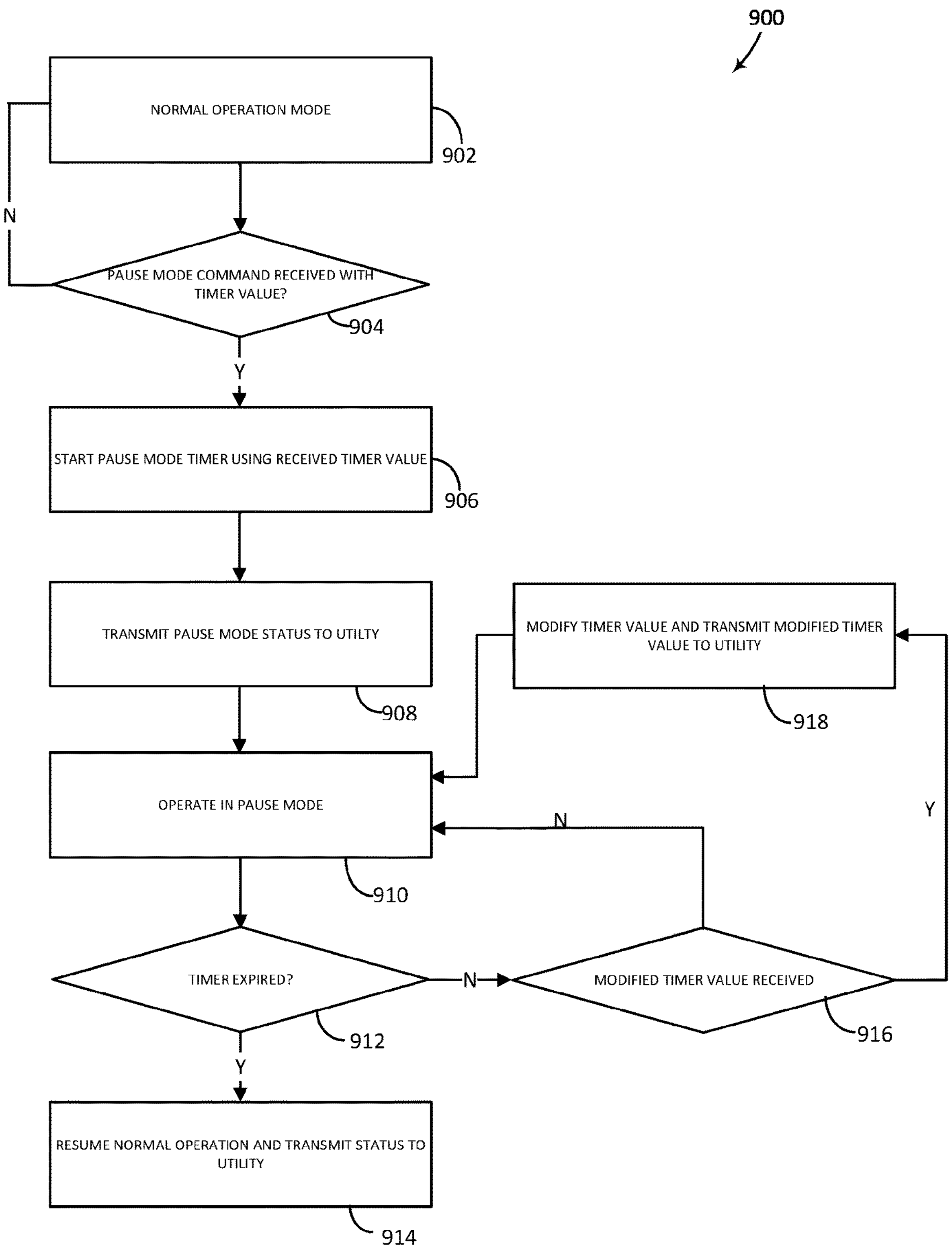
FIG. 9 is a flow chart illustrating a process for modifying a pause mode time of a hub device.

FIG. 9 is a flow chart illustrating a process 900 for modifying a pause mode timer of a hub device 700, according to some embodiments. Similar to the process 800 (FIG. 8) described above, the process 900 is executed by the hub device 700 (FIG. 7), except where otherwise noted. For example, the process 900 may be stored in the memory 706 (FIG. 7) and executed by the electronic processor 702 (FIG. 7).

At process block 902, the hub device 700 operates in a normal operation mode. The normal operation mode may be the standard operating mode for the sensor module. In one example, during the normal operation mode, the hub device 700 monitors sensor modules 200 and communicates data from the sensor modules 200 to the utility system 106. The sensor modules 200 may be configured to generate alarms in response to one or more of the sensed parameters exceeding a predetermined value and transmit the alarms to the hub device 700. For example, the sensor module 200 may generate an alarm in response to a detected methane level exceeding a predetermined threshold value. In some embodiments, the generated alarm may be transmitted to the hub device 700, such as via communication interface 216.

At process block 904, the hub device 700 determines whether a pause mode command has been received. The pause mode command may be issued by a communication device, such as communication device 300 (FIG. 3). In one embodiment, a user instructs the communication device 300 to transmit a pause mode command to the hub device 700, such as via the user interface 304. In other examples, the user may provide the pause mode command to the hub device 700 via the user interface 704 of the hub device 700 directly, such by actuating or operating one or more inputs of the user interface 704.

In response to determining that the pause mode command was not received, the hub device 700 continues operating in the normal operation mode at process block 902. In response to determining that the pause mode command was received, the hub device 700 initiates a pause mode timer at process block 906. The pause mode timer represents the amount of time in which the hub device 700 will remain in the pause mode. In some examples, the pause mode timer is set to a predefined default value. In some examples, the predefined default value is 60 minutes. However, predefined default values of more than 60 minutes or less than 60 minutes are also contemplated as required for a given application. In other examples, a user may be able to set the pause mode time, such as via the communication device 300 (FIG. 3). For example, for a given job, the user may set the pause timer to a value sufficient to complete the required job. In some instances, the user may not be able to set the pause mode timer to a value that exceeds a maximum value. For example, the user may not be able to set the pause mode timer to a value greater than 240 minutes. However, maximum values of more than 240 minutes or less than 240 minutes are also contemplated, as appropriate for a given application. In some instances, the pause timers may be automatically set by the communication device 300 (FIG. 3) based on a time associated with a required work order that is being performed.

At process block 908, the hub device 700 enters the pause mode and transmits the mode change status to the utility system 106 (FIG. 1). In one embodiment, the mode change status includes information such as the current mode (e.g., pause mode), the pause mode timer value, the time the mode was changed, and/or other data as required for a given application. The hub device 700 then operates in the pause mode at process block 910. As noted above, when operating in the pause mode, the hub device 700 does not generate or transmit alarms to the utility system 106 (FIG. 1). In some examples, operating in the pause mode may still allow for some alarms to be generated, but may require a higher threshold to generate the alarm. For example, where a sensor module 200 monitors methane (or other noxious gasses), an alarm may still be transmitted by the hub device 700 where the sensed gas concentration exceeds an upper limit, which is higher than a normal alarm threshold value.

At process block 912, the hub device 700 determines whether the pause mode timer has expired. In response to determining that the pause mode timer has expired, the hub device 700 resumes normal operation and transmits the mode status to the utility at process block 914, as described above.

In response to determining that the pause mode timer has not expired, the hub device 700 determines whether a modified pause timer value has been received at process block 916. Similar to the pause mode command, the modified timer value may be received at the hub device 700 from the communication device 300 (FIG. 3). For example, a user may input a modified timer value using the user interface 304 (FIG. 3) of the communication device 300, which can then be caused to transmit the modified timer value to the hub device 700. In other examples, a user may input the modified pause timer value directly into the hub device 700 such as via the user interface 704 (FIG. 7). The user may modify the pause timer value to be either greater than the initial value or less than the initial value. For example, the user may determine that the job will take additional time and extend the pause timer value. In other examples, the user may determine that the job will not take as long as expected and will reduce the pause timer value. For example, where a user finishes the job prior to the pause timer expiring, the user may send a command to the hub device 700, such as via the user interface 704 (FIG. 7), to set the pause timer value to 0. Additionally, the pause timer may also have a maximum value which the user is not allowed to exceed. In some embodiments, the maximum value may be a value 2x the initial pause mode timer value. However, other maximum values are also contemplated.

In response to determining that a modified timer value is not received, the hub device 700 continues to operate in the pause mode at process block 910. In response to determining that a modified timer value was received, the hub device 700 modifies the timer value and transmits the modified timer value to the utility system 106 (FIG. 1) at process block 918. Upon modifying the timer value, the hub device 700 operates in pause mode at process block 910 using the modified timer value, and continues operation as described above.

In the foregoing specification, specific embodiments have been described. However, one of ordinary skill in the art appreciates that various modifications and changes may be made without departing from the scope of the disclosure as set forth in the claims below. Accordingly, the specification and figures are to be regarded in an illustrative rather than a restrictive sense, and all such modifications are intended to be included within the scope of present teachings.

Various features and advantages of some embodiments are set forth in the following claims.

What is claimed is:

1. A utility sensor module, comprising:
- one or more sensors; and
- an electronic processor configured to,
  - receive a pause mode command;
  - initiate a pause mode timer at a first predefined timer value in response to receiving the pause mode command;
  - change an operating mode to a pause mode, wherein operation in the pause mode causes the sensor module to not generate an alarm when a parameter sensed by the one or more sensors exceeds a predetermined threshold;
  - transmit a signal to a utility system indicating that the operating mode has been changed to the pause mode;
  - determine whether the pause mode timer has expired; and
  - changing the operating mode to a normal operation mode in response to determining that the pause mode timer has expired.

2. The utility sensor module of claim 1, wherein the pause mode command is received from a user communication device.

3. The utility sensor module of claim 1, wherein the pause mode command is received via a user interface of the sensor module.

4. The utility sensor module of claim 1, wherein the electronic processor is further configured to:
- receive a pause mode cancel command; and
- change the operating mode to the normal operation mode in response to receiving the pause mode cancel command.

5. The utility sensor module of claim 1, wherein the electronic processor is further configured to receive a timer modification command, wherein the timer modification command includes a second predefined timer value.

6. The utility sensor module of claim 5, wherein the electronic processor is further configured to adjust the pause mode timer to the second predefined timer value in response to receiving the timer modification command.

7. The utility sensor module of claim 1, wherein the one or more sensors include a methane detection sensor.

8. A method for changing an operational mode of a sensor module, comprising:
- receiving a pause mode command at the sensor module;
- initiating a pause mode timer at a first predefined timer value in response to receiving the pause mode command;
- changing an operating mode to a pause mode, wherein operation in the pause mode causes the sensor module to not generate an alarm when a parameter sensed by one or more sensors of the sensor module exceeds a predetermined threshold;

transmitting a signal to a utility system indicating that the operating mode has been changed to the pause mode;

determining whether the pause mode timer has expired; and changing the operating mode to a normal operating mode in response to determining that the pause mode timer has expired.

9. The method of claim 8, wherein the pause mode command is received from an external communication device.

10. The method of claim 8, where the pause mode command is received via a user interface of the sensor module.

11. The method of claim 8, further comprising:

receiving a pause mode cancel command; and changing the operating mode to the normal operation mode in response to receiving the pause mode cancel command.

12. The method of claim 8, further comprising receiving a timer modification command, wherein the timer modification command includes a second predefined timer value.

13. The method of claim 12, further comprising adjusting the pause mode timer to the second predefined timer value in response to receiving the timer modification command.

14. The method of claim 8, wherein the one or more sensors include a methane detection sensor.

15. A utility monitoring system, comprising:

at least one sensor module, including one or more sensors for sensing aspects of a utility system, and configured to generate an alarm when a parameter sensed by the one or more sensors exceeds a predetermined threshold; and a hub device, the hub device configured to receive data from the at least one sensor module and including an electronic processor configured to:

receive a pause mode command;

initiate a pause mode timer at a first predefined timer value in response to receiving the pause mode command;

change an operating mode to a pause mode, wherein operation in the pause mode causes the hub device to not transmit alarm data received from the at least one sensor module to a utility system when a parameter sensed by the at least one sensor module exceeds a predetermine threshold;

transmit a signal to the utility system indicating that the operating mode has been changed to the pause mode;

determine whether the pause mode timer has expired;

determine whether a pause mode cancel command was received; and change the operating mode to a normal operation mode in response to determining that one of the pause mode timer has expired, or the pause mode cancel command was received.

16. The utility monitoring system of claim 15, wherein the pause mode command is received from an external communication device.

17. The utility monitoring system of claim 15, wherein the pause mode command is received via a user interface of the hub device.

18. The utility monitoring system of claim 15, wherein the electronic processor is further configured to receive a timer modification command, wherein the timer modification command includes a second predefined timer value.

19. The utility monitoring system of claim 18, wherein the electronic processor is further configured to adjust the pause mode timer to the second predefined timer value in response to receiving the timer modification command.

20. The utility monitoring system of claim 15, wherein the electronic processor is further configured to, when operating in the pause mode, transmit an alarm in response to a parameter sensed by the at least one sensor module exceeding a pause mode alarm threshold value, wherein the pause mode alarm threshold is greater than the predetermined threshold.

* * * * *